(12) United States Patent
Cobb

(10) Patent No.: US 7,314,095 B2
(45) Date of Patent: Jan. 1, 2008

(54) GARDENING TOOL

(76) Inventor: Delwin E. Cobb, 2323 Parana Dr., Houston, TX (US) 77080

( * ) Notice: Subject to any disclaimer, the term of this patent is extended or adjusted under 35 U.S.C. 154(b) by 0 days.

(21) Appl. No.: 10/940,462

(22) Filed: Sep. 14, 2004

(65) Prior Publication Data

US 2006/0070751 A1    Apr. 6, 2006

(51) Int. Cl.
*A01B 33/06*  (2006.01)
(52) U.S. Cl. .................. 172/25; 172/41; 172/378
(58) Field of Classification Search ............. 172/25, 172/250, 21, 22, 371, 372, 378, 41; 294/50.5, 294/61; 111/92, 95, 96; 30/DIG. 7, 500
See application file for complete search history.

(56) References Cited

U.S. PATENT DOCUMENTS

| | | | |
|---|---|---|---|
| 643,165 A | 2/1900 | Schumacher | |
| 858,429 A | 7/1907 | Webb et al. | |
| 944,393 A | 12/1909 | Whitney | |
| 1,092,818 A | 4/1914 | Bittner, Jr. | |
| 1,134,618 A | 4/1915 | Kaufman | |
| 1,262,693 A | 4/1918 | Page | |
| 1,549,198 A | 8/1925 | Haney | |
| 1,553,719 A | 9/1925 | Rhoads | |
| 2,030,770 A | 2/1936 | Smith | |
| 2,500,647 A * | 3/1950 | Schulthess | 294/61 |
| 2,521,032 A | 9/1950 | Becker | |
| 2,552,467 A * | 5/1951 | Thomas | 294/61 |
| 2,593,283 A * | 4/1952 | Erlebach, Sr. | 294/50 |
| 2,615,246 A | 10/1952 | Littig | |
| 2,695,188 A * | 11/1954 | Nutt et al. | 294/61 |
| 2,779,259 A | 1/1957 | Kelsey | |
| 2,812,969 A | 11/1957 | Fornelius | |
| 3,198,719 A | 8/1965 | Stewart | |
| 3,554,293 A | 1/1971 | Aman et al. | |
| 3,847,227 A | 11/1974 | Myers | |
| 4,213,504 A * | 7/1980 | Schneider | 172/25 |
| 4,326,743 A | 4/1982 | Tamura | |
| 4,603,744 A | 8/1986 | Ramirez | |
| 4,641,712 A * | 2/1987 | Cravotta | 172/25 |
| 5,004,283 A | 4/1991 | Sullivan | |
| 5,005,888 A | 4/1991 | Parks et al. | |
| 5,193,871 A * | 3/1993 | Williams | 294/61 |
| 5,261,496 A * | 11/1993 | Smotherman | 172/25 |
| 5,330,010 A * | 7/1994 | Smotherman | 172/25 |
| 5,452,767 A | 9/1995 | Smotherman | |
| 5,810,093 A | 9/1998 | Howard | |
| 6,722,444 B2 * | 4/2004 | McKill | 172/41 |

* cited by examiner

*Primary Examiner*—Thomas B. Will
*Assistant Examiner*—Jamie L McGowan
(74) *Attorney, Agent, or Firm*—Browning Bushman P.C.

(57) ABSTRACT

A gardening tool extracts a weed along with a plug of soil. A plurality of blades are circumferentially spaced about an axis of a shaft and extend downwardly beyond the lower end of the shaft for insertion into soil about the roots. Each blade includes a trailing edge and a leading edge that leads the trailing edge during rotation in a selected rotational direction about the axis. An ejector body is positioned between the blades and is axially movable from an upper position to a lower position to eject soil from between the blades. An ejector control member at least substantially surrounding the shaft is axially movable by hand. A plurality of connecting members are circumferentially spaced about the shaft and connect the ejector control member to the ejector body, such that axial movement of the ejector control member causes axial movement of the ejector body.

17 Claims, 7 Drawing Sheets

GARDENING TOOL

FIELD OF THE INVENTION

The invention relates to a gardening tool for extracting undesired vegetation from soil. In particular, the gardening tool includes circumferentially spaced blades which are rotated through the soil to capture the vegetation by the roots, and an ejector mechanism for ejecting the extracted vegetation from between the blades.

BACKGROUND OF THE INVENTION

Removing unwanted vegetation such as weeds from lawns, gardens, plant beds, and other areas can be tedious, particularly without tools. Numerous gardening tools have been devised for extracting weeds and other vegetation, and are referred to herein generally as "weed pullers". These tools typically have tines or blades that are designed to capture the vegetation by the roots, along with some of the surrounding soil (which can include dirt, sand, and other mediums in which such vegetation takes root). Some of the tools have tines or blades that are inserted into the soil about the roots and then rotated to extract most or all of the root along with a plug of soil, to prevent the undesired vegetation from growing back. The extracted vegetation may then be removed from the tool and discarded.

Some weed pullers using rotating blades or tines also include an ejector mechanism for removing the extracted vegetation from between the blades or tines. Examples of this type are disclosed in U.S. Pat. No. 2,030,770 to Smith and U.S. Pat. No. 4,603,744 to Ramirez. Such ejector mechanisms are typically fairly complicated and are thus more prone to failure. The Smith patent discloses ejector mechanism components, such as a biasing spring, that are at least partially enclosed in a housing. This arrangement makes the components relatively inaccessible for cleaning or repair. The Ramirez tool discloses a potentially more accessible biasing spring, but at least one embodiment of its ejector mechanism may be mechanically imbalanced, making the tool prone to failing or operating inefficiently.

The tines of many weed-pulling devices resemble narrow prongs, which generally have a smaller cross-sectional area than blades, as well as a narrower "circumferential" width, as measured with reference to a circular path followed by the tines or blades in rotation about a shaft axis. In some instances, the decreased cross-section of these tines increases ease of penetration but decreases their torsional strength and rigidity. The narrower tines are typically less capable of retaining a plug of soil. Devices of this type are disclosed in U.S. Pat. Nos. 4,326,743, 5,005,888, 5,004,283, 944,393, and Design Patent 322,918. By contrast, the increased circumferential width of blades may desirably increase torsional strength and rigidity, with a slight reduction in the ease of penetration.

Many weed pullers having blades or tines pose safety risks. Some have teeth, serrations, or other sharp features on the blades, which may endanger the operator. Some of these tools are powered with motors, such as drill motors, which increase their efficacy but also increase the risk of injury.

Other patents of interest include U.S. Pat. Nos. 5,810,093, 3,554,293, 3,847,227, 3,198,719, 2,779,259, and 5,452,767.

The present invention overcomes many of the disadvantages of other weed pulling devices. An improved gardening tool is disclosed that is relatively economical, safe, and easy to use, and that provides a more reliable mechanism for ejecting extracted vegetation.

BRIEF SUMMARY OF THE INVENTION

According to one preferred embodiment, a gardening tool is provided for extracting vegetation having roots in soil, or to remove plugs of soil. A shaft is rotatable about an axis, and includes an upper end and a lower end axially spaced from the upper end. A plurality of blades are circumferentially spaced about the axis and extend downwardly beyond the lower end of the shaft for insertion into soil about the roots. Each blade includes a trailing edge and a leading edge that leads the trailing edge during rotation in a selected rotational direction about the axis. The leading edge of at least one blade is substantially non-tapered to extend in a direction substantially parallel to the axis. The trailing edge is tapered along at least 50% of the blade's length to extend in a direction angled relative to the axis, such that a circumferential width of the blade decreases in the downward direction. A blade plate at an upper end of the blades connects the blades. The shaft is preferably secured to the blade plate. An ejector body is positioned between the blades, and is axially movable from an upper position to a lower position to eject soil from between the blades. An ejector control member at least substantially surrounds the shaft, and is axially movable by hand. A plurality of connecting members are substantially evenly spaced circumferentially about the shaft such that each connecting member is circumferentially positioned between two of the blades. The connecting members connect the ejector control member to the ejector body such that axial movement of the ejector control member causes axial movement of the ejector body.

DETAILED DESCRIPTION OF THE PREFERRED EMBODIMENTS

Figure 1:
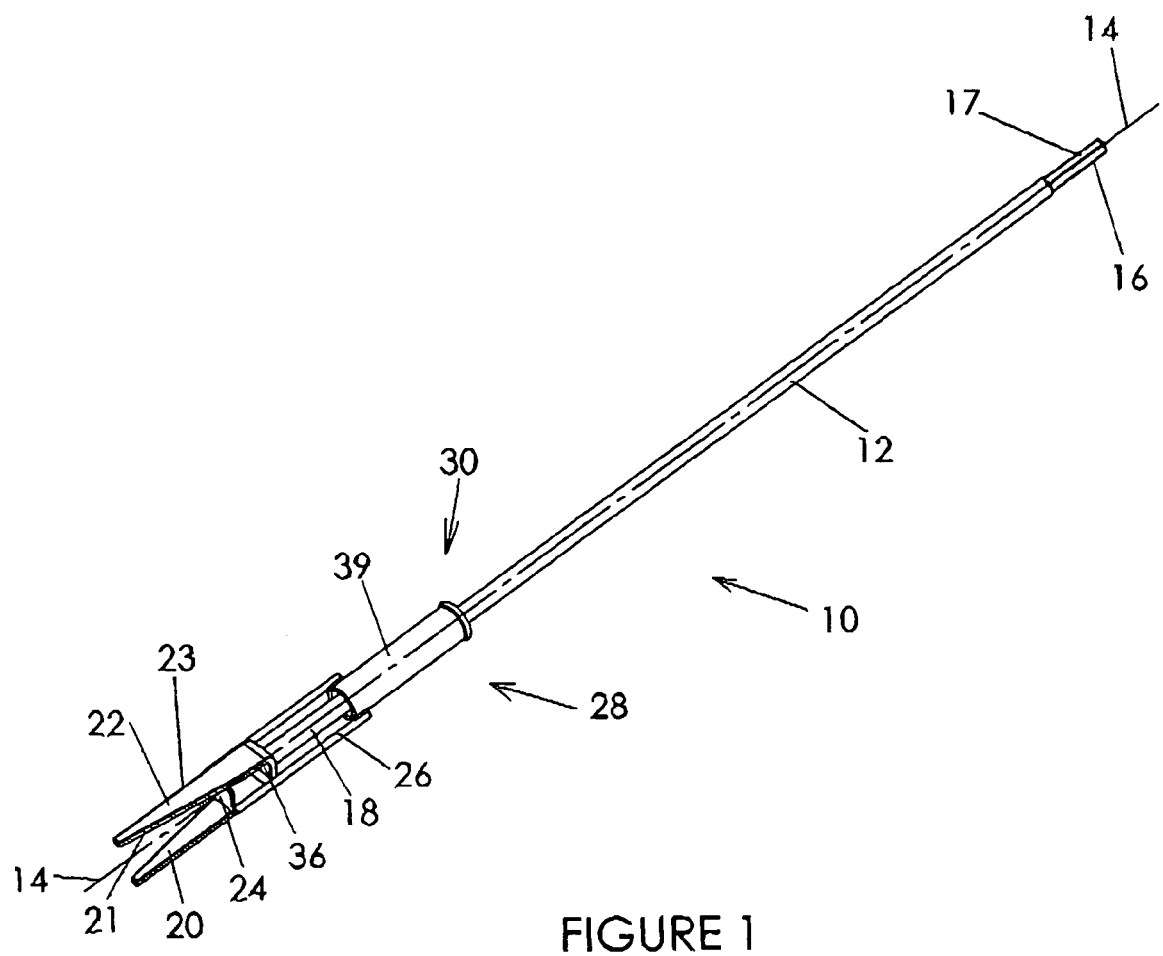
FIG. 1 conceptually illustrates a portion of a preferred embodiment of a gardening tool.

FIG. 1 conceptually illustrates a portion of a preferred embodiment of a gardening tool 10 for extracting vegetation having roots. The tool is ideally suited for extracting undesirable vegetation, referred to generally herein as "weeds," which typically take root in areas in which other desirable vegetation is located, such as in a lawn or garden. Virtually all weeds have roots within "soil," which is defined herein to include earth, potting soil, dirt, sand, any mixture thereof, or any other medium in which weeds take root. The tool is intended to capture and extract the weed primarily by its roots from within the soil. The tool 10 may also be used to produce holes in soil for such applications as planting bulbs and small plants, root feeding, and soil aeration.

The tool 10 has a shaft 12 rotatable about an axis 14, which is an imaginary line about which the shaft 12 and other portions of the tool 10 may rotate, and with respect to which portions of the tool 10 may be referred. The shaft 12 typically has an approximately circular cross-section along at least a portion of the shaft 12, such as if the shaft 12 is manufactured from a section of circular rod as shown, and the axis 14 may therefore coincide with a centerline of the generally circular portion of the shaft 12. The shaft 12 may alternatively comprise a non-circular cross section, and the axis 14 may substantially coincide with a centerline or an axis of symmetry of the shaft 12. The shaft 12 includes an upper end 16 and a lower end 18 axially spaced from the upper end 16. The terms "up" and "down" are defined herein with respect to the direction of gravity acting on the tool 10. In use, the tool 10 will generally be oriented such that the upper end 16 is oriented above the lower end 18. In particular, when pulling weeds, the tool 10 is preferably positioned vertically or at a steep angle with respect to the Earth's surface in the vicinity of the soil. The upper end 16 of the shaft 12 may include flats 17 for securely gripping the shaft 12 with a drill, other motor-operated device, or the tool 10 may include a hand-operated crank.

A plurality of blades—in FIG. 1, two blades 20, 22—are circumferentially spaced about the axis 14 and extend downwardly beyond the lower end 18 of the shaft 12 for insertion into soil about the roots. "Circumferentially spaced" is defined with reference to the generally circular path a component of the tool 10 will follow when rotated about the axis 14, and refers to the angular spacing about that circular path, regardless of radial positioning with respect to the axis 14. For example, blade 22 is circumferentially spaced 180 degrees with respect to blade 20. Each blade includes a trailing edge (e.g. edge 21 of blade 22) and a leading edge (e.g. edge 23 of blade 22) that leads the trailing edge during rotation of the blades 20, 22 in a selected rotational direction about the axis 14. In FIG. 1, the selected rotational direction is clockwise when looking down on the tool 10 from above.

Figure 2:
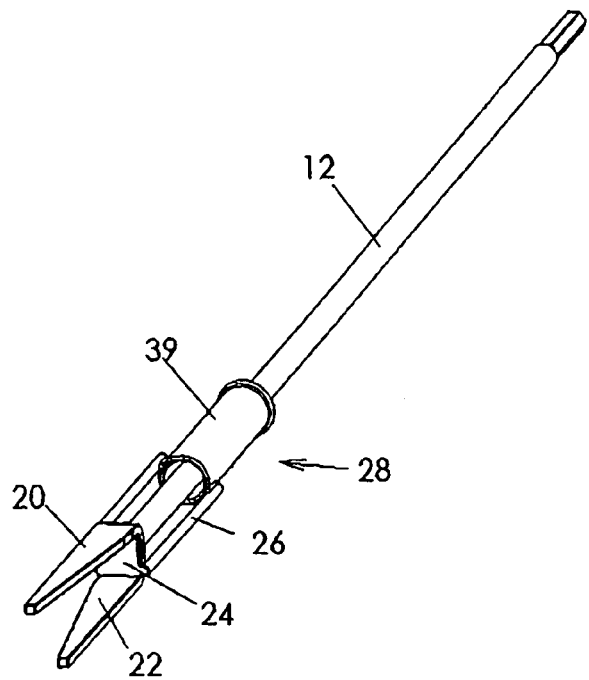
FIG. 2 shows the ejector body in an upper position.
Figure 3:
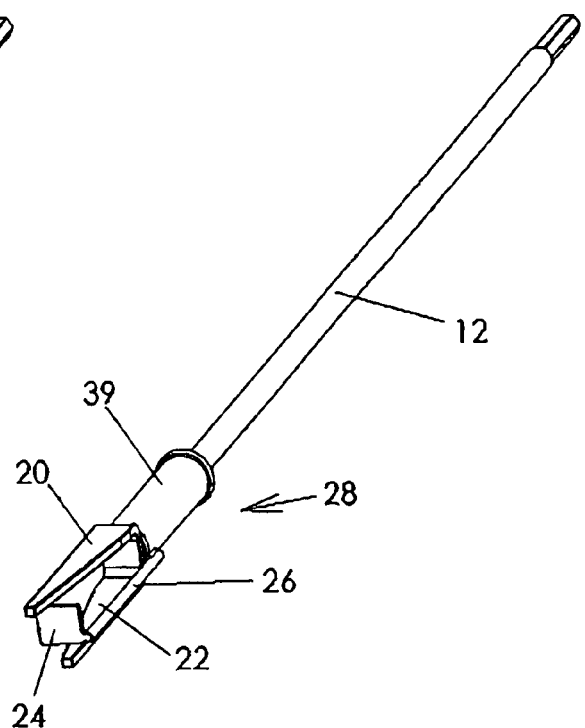
FIG. 3 shows the ejector body in a lower position.
Figure 4:
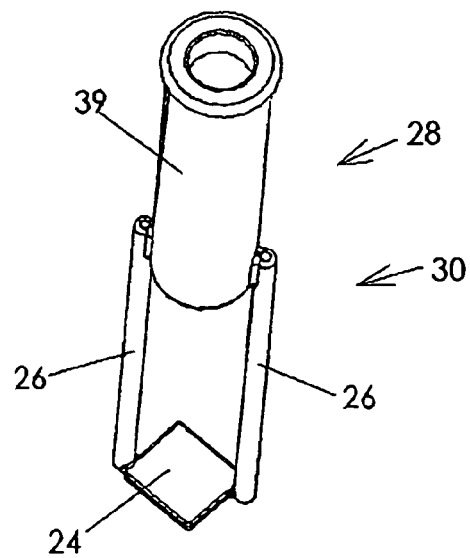
FIG. 4 details an embodiment of the ejector mechanism.

An ejector mechanism 30 is detailed in FIG. 4. The ejector assembly 30 rotates with the blades 20, 22 and shaft 12. The ejector mechanism 30 includes an ejector body 24, a plurality of connecting members 26, and an ejector control member 28 axially movable by hand. The ejector body 24 is positioned between the blades 20, 22 and is axially movable from an upper position (shown in FIG. 2) to a lower position (shown in FIG. 3) to eject extracted soil from between the blades 20, 22. The ejector control member 28 at least substantially surrounds the shaft 12, and may slidably contact the shaft 12. The connecting members 26 connect the ejector control member 28 to the ejector body 24, such that axial movement of the ejector control member 28 causes axial movement of the ejector body 24. The ejector control member 28 is preferably axially movable by hand, to allow the operator to safely and reliably operate the ejector mechanism 30 as desired. As shown, an operator can thus move the ejector body 24 between the upper (FIG. 2) and lower (FIG. 3) positions by hand. Accordingly, in most embodiments, the ejector control member 28 may be referred to as a "handle."

The plurality of connecting members 26 are circumferentially spaced about the shaft 12. Preferably, the connecting members 26 are evenly spaced circumferentially. Evenly spacing the connecting members 26 ensures a mechanical balance of the ejector mechanism 30, to maximize efficient and reliable operation. For example, two connecting members 26 are shown in FIG. 1, circumferentially spaced approximately 180 degrees from one another. Another embodiment (not shown) may include, for example, four blades and four connecting members, the connecting members spaced evenly at 90 degree intervals, each connecting member positioned between two of the blades.

Figure 10:
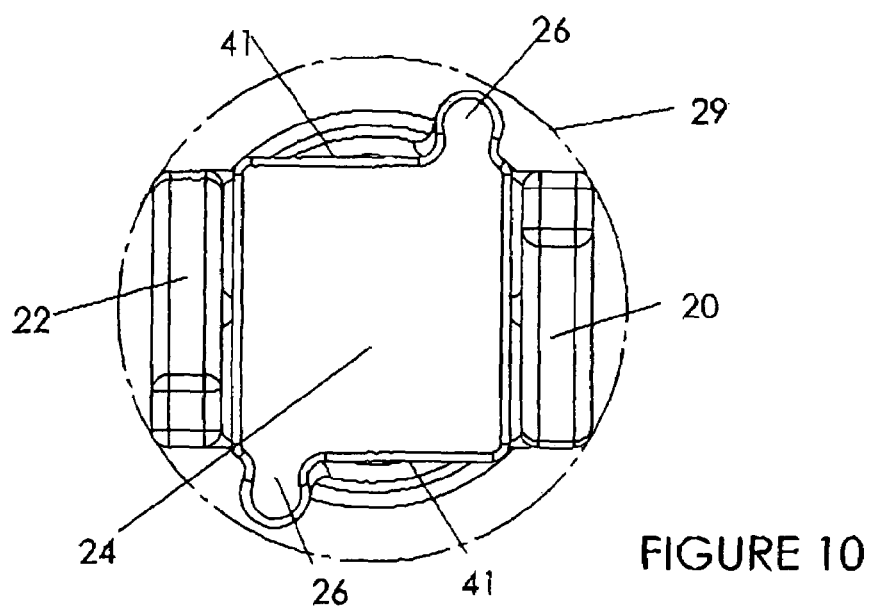
FIG. 10 shows another view of the ejector body having off-center connecting members.

As best illustrated in FIG. 10, a useful feature of the ejector mechanism is the placement of the connecting members 26 with respect to the ejector body 24. As shown, the connecting members 26 are positioned off-center with respect to edges 41. This provides some extra clearance adjacent the ejector body 24 to accommodate weeds.

Another important feature of a preferred embodiment is that components of the ejector mechanism 30 above the blades 20, 22 are at least slightly radially inward of the blades, such that the ejector mechanism 30 may pass into the hole with repeated excavations. This is useful when, for example, a hole must be dug deeper. To illustrate, in FIG. 10, the radially outermost portion of the connecting members 26 traces circular path 29 during rotation. As shown, both the connecting members 26 and the sleeve-shaped handle 39 are radially inward of the circular path 29, so that they will fit within a hole during repeated excavations of that hole.

In a preferred embodiment, the circumferential positioning of the connecting members 26 may be determined as a function of the circumferential positioning of the blades. In particular, each connecting member is preferably circumferentially positioned between two of the blades, as exemplified by the positioning of connecting members 26 between blades 20, 22. One advantage of positioning the connecting members 26 circumferentially between the blades 20, 22 is that the connecting members 26 might be positioned more radially inward than if the connecting members 26 were circumferentially aligned with the blades 20, 22. Furthermore, if the connecting members 26 were circumferentially aligned with the blades, the ejector body 24 would likely require an overly complex shape to reach from between the blades 20, 22 to a point radially outward and circumferentially aligned with the blades 20, 22 for securing to the connecting members 26.

Figure 5:
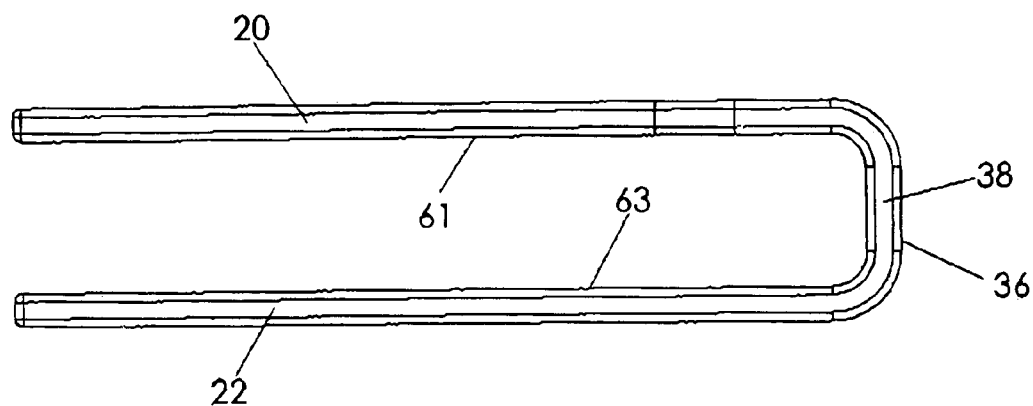
FIG. 5 shows a detailed view of the blades.
Figure 6:
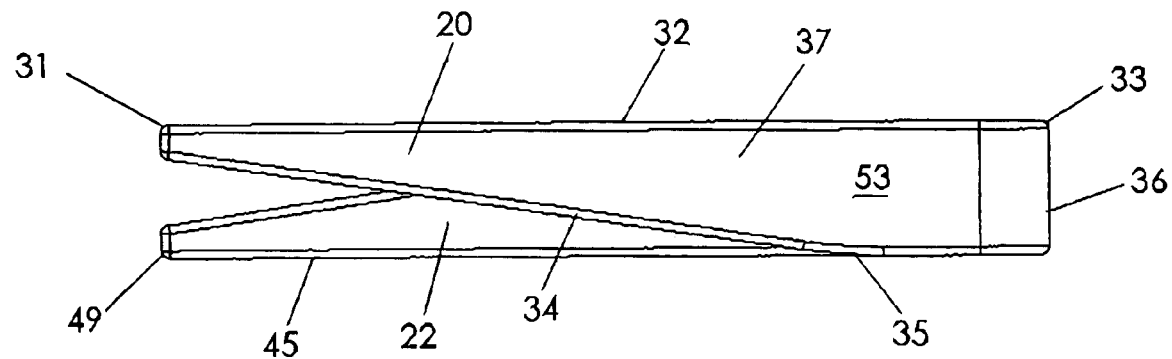
FIG. 6 shows the blades rotated 90 degrees from their FIG. 5 position.
Figure 9:
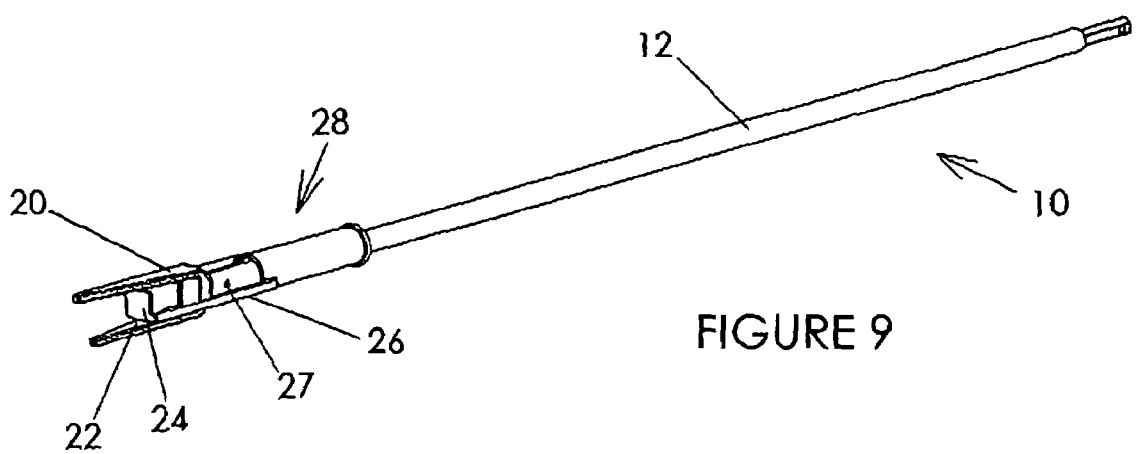
FIG. 9 shows an alternative embodiment of the tool.
Figure 11:
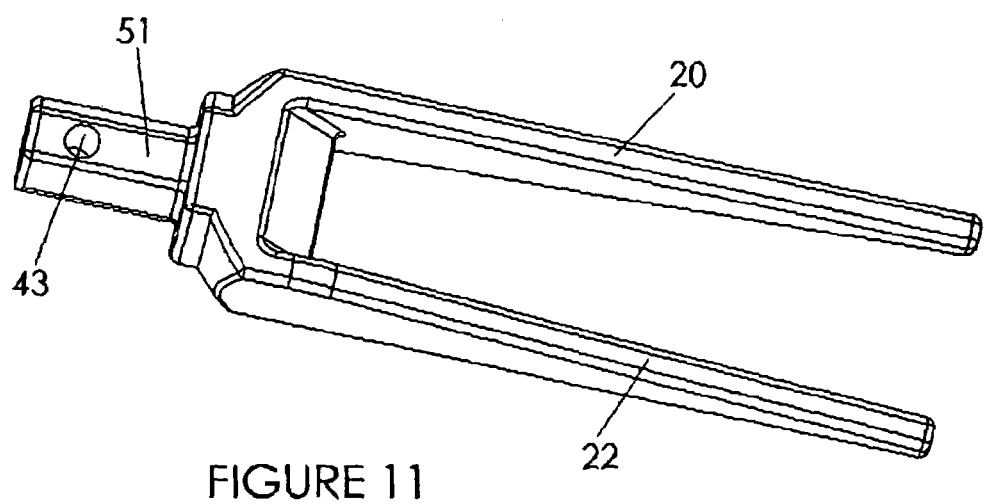
FIG. 11 shows a detailed view of the hexagonal extension of FIG. 9 for securing the blades to the shaft.

FIGS. 5 and 6 show views of the blades 20, 22. The blades 20, 22 in FIG. 5 are rotated 90 degrees from their position in FIG. 6. A blade plate 36 at an upper end 33 of the blades 20, 22 connects the blades 20, 22. The shaft 12 may be welded to the blade plate 36. Alternatively, as shown in FIGS. 9 and 11, the shaft 12 may be secured to the blades 20, 22 with a non-circular shape such as a hexagonal extension 51, and the shaft 12 may have a similarly shaped cross section for mating with the noncircular extension 51 to resist rotation about the axis 14 of the shaft 12 with respect to the blades 20, 22. A pin 27 (FIG. 9) passing through pin hole 43 (FIG. 11) is used to hold the shaft 12 on the hexagonal extension 51.

The blades 20, 22 are preferably tapered, as shown in FIG. 6. To illustrate with blade 20, the leading edge 32 is substantially "straight" or non-tapered along the blade's length to extend in a direction substantially parallel to the axis 14, which desirably forms a substantially uniform diameter cylinder along a majority of the length of each blade when rotatinq. Although the blade 20 extends from its lower tip 31 to its upper end 33, the blade's "length" is defined herein as the length of the portion of the blade that can be inserted into the soil, i.e. the length from the tip 31 to the ejector body 24 when the ejector body 24 is in the upper position of FIG. 2. Thus, the "length" of blade 20 may be described as the "insertion length" of the blade 20 for purpose of this description. At least a portion of the trailing edge 34 is tapered from tip 31 to point 35, to extend in a direction angled relative to the axis 14 of the shaft 12, such that a circumferential width of the blade 20 decreases in the downward direction. Preferably, the trailing edge 34 is tapered along at least 50% of the blade's length. As shown in FIGS. 1-3 and 5-7, the circumferential width of each blade is substantially greater than its radial thickness along a majority of the length of each blade.

Tapering of one edge of the blade offers several advantages. It provides the increased strength and rigidity characteristic of the greater circumferential width of a blade, while providing a more pointed tip 31 that allows for easier insertion into the soil. The tapering therefore acts like a wedge to gradually rather than suddenly separate the soil around the blades as the blades 20, 22 enter the soil. The tapering also decreases surface area on the radially outward side 37, to decrease friction between the blades 20, 22 and the soil. It is advantageous to taper only the trailing edge 34, leaving the leading edge 32 straight, to prevent tapered or otherwise irregular holes in the soil. A double-tapered flat blade, i.e. having both a tapered leading edge and a tapered trailing edge, would typically not extract as much of the root, and it would make repeated penetrations difficult. The tapered trailing edge of the blades also reduce the ejection forces.

It is useful for the tip 31 to be narrow to more easily penetrate the soil, especially where there are many strong roots to avoid. The tip 31 need not be sharp to the touch, however, for easy penetration. The taper is preferably less than about 30 degrees with respect to the axis 14. An angle between 10 and 20 degrees, and preferably of approximately 15 degrees, is usually sufficient.

In preferred embodiments, the connecting members 26 are in sliding contact with the blade plate 36 during axial movement of the connecting members 26. The connecting members 26 may frictionally engage the blade plate 36 with enough frictional force to resist axial movement of the ejector control member 28 by gravity, so that the ejector control member 28 does not move appreciably until the operator applies a force to the control member 28. Similarly, in some embodiments, the ejector control member 28 may frictionally engage the shaft 12 with enough frictional force to resist axial movement of the ejector control member 28 by gravity, so that the ejector control member 28 does not move until the operator desires to apply a force to the control member 28.

With particular reference to FIGS. 1 and 4, at least a portion of the ejector control member 28 fully circumscribes the shaft 12 and is in sliding contact with the shaft 12. In the embodiment shown, the ejector control member 28 comprises a sleeve-shaped handle 39.

Figure 7:
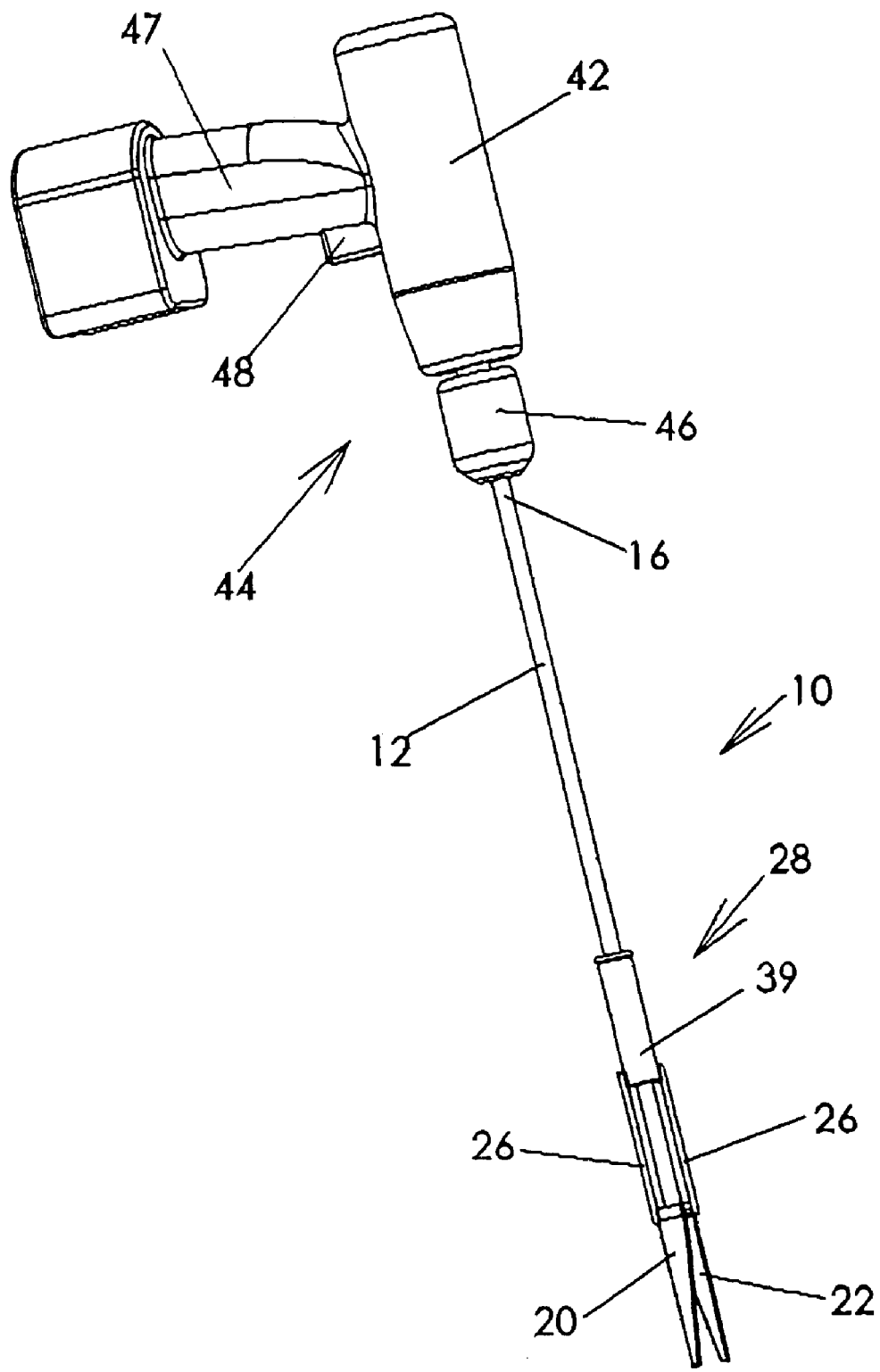
FIG. 7 shows an embodiment including a drill having a motor for rotating the shaft.

In some embodiments, as illustrated in FIG. 7, a motor 42 may be positioned at the upper end 16 of the shaft 12 for rotating the shaft 12 about the axis 14. The motor 42 in FIG. 7 is included with a powered drill 44. The drill 44 has a chuck 46 for engaging the flats 17 of the shaft 12. A handle 47 is included with the drill 44 for the operator to hold the drill 44 along with the attached tool 10, and a trigger 48 is provided for selectively turning on the motor 42 to rotate the tool 10 about the axis 14. The powered motor 42 provides power and convenience for operating the tool 10.

Figure 8:
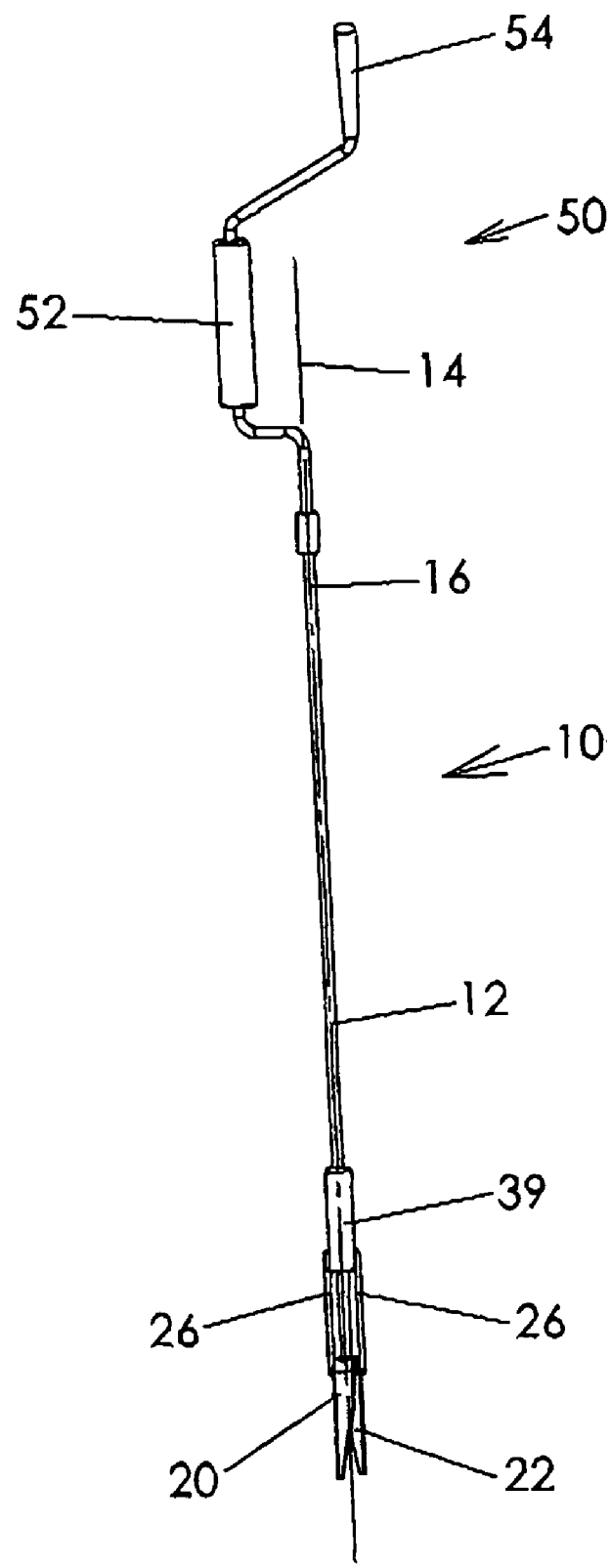
FIG. 8 shows an embodiment including a hand crank for rotating the shaft.

In other embodiments, as illustrated in FIG. 8, a hand crank 50 is optionally included at the upper end 16 of the shaft 12 for rotating the shaft 12 about the axis 14. A first handle 52 is axially spaced from a second handle 54, and both handles 52, 54 are radially outward from axis 14. In a preferred method of operation, the operator will hold handle 52 with one hand, handle 54 with the other hand, and rotate the tool 10 about the axis 14. A hand crank 50 provides the simplicity of a non-powered tool, and may provide plenty of leverage for pulling most weeds.

According to one preferred method of use, the user/operator may first move the shaft downward to insert the blades into the soil about the roots. Next, the user applies a torque to the shaft, such as by pulling the trigger 48 on a drill 44 (FIG. 7) or by turning the hand crank 50 (FIG. 8) to rotate the blades 20, 22 in the selected direction about the axis 14.

The blades 20, 22 may need to be rotated several times to fully capture the roots, which may desirably wind around the blades during rotation, to firmly glom onto the weed or other vegetation. This winding action also helps ensure the roots are fully captured, so that the weed cannot simply regrow. Then, while continuing to rotate the tool 10, the user may move the blades 20, 22 upward by pulling up on the tool 10, to extract a portion of the soil along with preferably most or all of the weed. Next, the user may move the ejector control member 28 by hand to move the ejector body 24 from the upper position (FIG. 2) to the lower position (FIG. 3) to eject the extracted portion of the soil from between the blades 20, 22. The operator preferably then pulls up on the control member 28 to return the ejector body 24 to the upper position (FIG. 2) before extracting another weed. In some embodiments (not shown), a spring may be included to bias the ejector body 24 to the upper position.

In some embodiments, the tool 10 may instead be used to extract plugs of soil without extracting a weed, to create holes for such applications as planting bulbs and small plants, root feeding, and soil aeration. The method of use would be similar. The user/operator may first move the shaft downward to insert the blades into the soil. Next, the user applies a torque to the shaft, such as by pulling the trigger 48 on a drill 44 (FIG. 7) or by turning the hand crank 50 (FIG. 8) to rotate the blades 20, 22 in the selected direction about the axis 14. The blades 20, 22 may need to be rotated several times to fully form the plug 60 of soil. Then, while continuing to rotate the tool 10, the user may move the blades 20, 22 upward by pulling up on the tool 10, to extract a plug of soil. Rotating the tool while pulling up helps retain the soil (and the weed, if present). Finally, the user may move the ejector control member 28 by hand to move the ejector body 24 from the upper position (FIG. 2) to the lower position (FIG. 3) to eject the extracted plug of the soil from between the blades 20, 22. The operator preferably then pulls up on the control member 28 to return the ejector body 24 to the upper position (FIG. 2) before forming another plug or removing another weed. If the entire root is too long and deep to be removed with one insertion of the tool 10, repeated excavations may be performed to go increasingly deeper. Several revolutions of the tool 10 are sometimes needed for deeper or tougher roots.

For most applications, a hole diameter of approximately 0.9 inches and a blade length of approximately 2.6 inches works well. For smaller diameter holes, only two blades may be necessary, as shown. For larger diameter holes, more blades may be included to help retain the extracted soil plug between the blades.

As shown in FIGS. 5 and 6, any sharp edges of the blades 20, 22 are preferably rounded, such as edges 45 and 32. These rounded edges ensure the roots are pulled and wrapped around the blades 20, 22 without being cut off by the blades 20, 22, to prevent the weed from growing back. The rounded edges are also for safety, to minimize sharp edges that may otherwise injure the operator. By contrast, the outer surface 53 of the blades are preferably flat (as opposed to being radiused with respect to the axis 14), to minimize frictional contact with the soil. The radially inner surface 61, 63 of each of the blades is also flat, as shown in FIGS. 5 and 11. This facilitates the inner surface of each blade desirably shearing and rotating a plug of soil in the hole during use of the tool, so that the soil and root are removed with the tool when pulled from the hole, and allows for a lower portion of the hole to be drilled after the plug of soil is removed. The open circumferential space between the blades thus allows the blades to be inserted around strong stems and roots of weeds so the vegetation may be captured and removed from the hole without cutting the root or stem short. In addition, the open space between the blades allows several seeds with shallow root to be removed without taking time to eject each slug of soil and week separately.

Compared to round rods or tines that are often used in tools of this type, the flat-plate blades 20, 22 are much stronger. For example, a blade may be 2700% stronger than a round tine in resisting applied torques if the thickness of the blade is equal to the diameter of the compared round tine and the circumferential width of the blade is four times its thickness. In the radial direction, the blade has been computed to be approximately 680% stronger. For satisfactory strength, the round tine would have to be much larger. Larger diameters will increase the penetration forces, the required torque about axis 14, and the size of the excavated hole.

Figure 12:
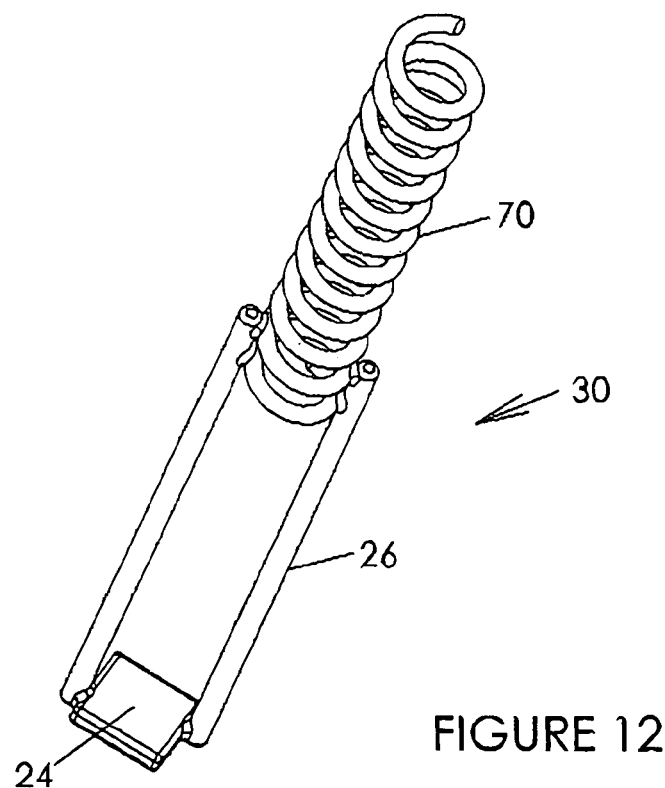
FIG. 12 shows an alternate embodiment of an ejector control member.

FIG. 12 shows an alternate embodiment of an ejector assembly 30, including an ejector body 24 and a plurality of connecting members 26. The sleeve-shaped ejector control member 28 shown in FIGS. 7 and 8 has been replaced with a coil spring 70. Ejector control member 70 is axially movable by hand and surrounds the shaft 12. A feature of the coil spring ejector control member 70 is that the spacing between the coils allows the control member 70 to be easily cleaned, and significantly reduces the likelihood of the annular space between the ejector control member and the handle becoming clogged with soil. The coil spring 70 is also low cost and lightweight.

Figure 13:
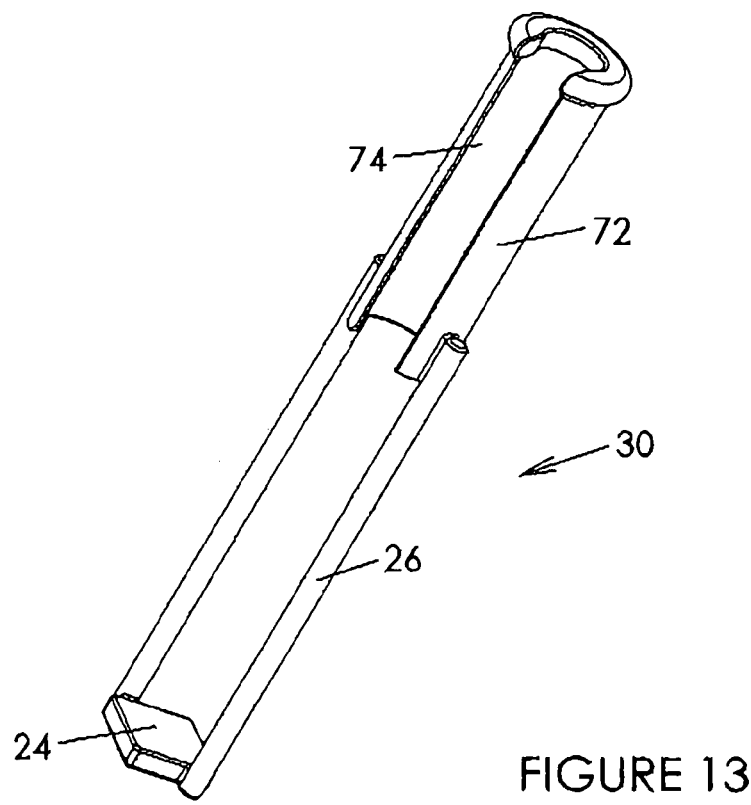
FIG. 13 illustrates another embodiment of an ejector control member.

FIG. 13 discloses yet another embodiment of an ejector control member, and particularly one which allows the shaft 12 and the blades 20, 22 to be manufactured as a subassembly, with the ejector control mechanism as shown in FIG. 13 then added to the subassembly. More particularly, the ejector assembly 30 as shown in FIG. 13 uses a control member 72 which has an elongate slot 74 therein. The width of the slot 74 allows the C-shaped control member 72 to be snapped over the shaft 12, with the ejector body 24 positioned between the blades 20 and 22, as previously discussed. This embodiment also allows the ejector assembly 30 to be removed from the shaft and the blades for cleaning, repair, or replacement. The C-shaped control member 72 may be snapped onto the shaft 12 and, if desired, a pair of plyers used to reduce the width of slot 74 to ensure that the member 72 remains on the shaft. As previously discussed, the configuration of the control member 70 as shown in FIG. 12 or the control member 72 as shown on FIG. 13 may maintain sufficient frictional engagement with the shaft, e.g., by providing a slight bend in the control member, so that frictional engagement with the shaft resists axial movement of the ejector control member by gravity, and the ejector control member only moves when the operator applies a desired axial force to the control member 28. The control member 72 as shown in FIG. 13 has significant advantages in that it will reduce manufacturing costs for the assembly.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations, and modifications, including but not limited to those design alternatives specifically discussed herein, may be made in the practice of the invention without departing from its scope.

The invention claimed is:

1. A gardening tool, comprising:
a shaft rotatable about an axis, the shaft including an upper end and a lower end axially spaced from the upper end;
a plurality of blades circumferentially spaced about the axis and extending downwardly beyond the lower end of the shaft for insertion into soil about the roots, each blade including a trailing edge and a leading edge that leads the trailing edge during rotation in a selected rotational direction about the axis, each blade having a circumferential width substantially greater than its radial thickness along a majority of the length of each blade, the circumferential width of each blade being substantially perpendicular to the radial thickness of the respective blade, the trailing edge being tapered relative to the axis of the shaft along a majority of the length of each blade, and the leading edge when rotating forming a uniform diameter cylinder along the majority of the length of each blade, each blade having a flat interior surface to rotate soil radially interior of the interior surface of the blade and within the rotating blades;
an ejector body positioned between the blades, the ejector body axially movable from an upper position to a lower position to eject soil from between the blades, each of the plurality of blades extending from a lower tip end to a blade upper end opposite the ejector body with respect to the lower tip end;
an ejector control member at least substantially surrounding the shaft, the ejector control member axially movable by hand; and
one or more axially extending connecting members circumferentially spaced about the shaft and connecting the ejector control member to the ejector body, such that axial movement of the ejector control member causes axial movement of the ejector body.

2. A gardening tool as defined in claim 1, wherein each of the one or more connecting member is circumferentially positioned between two of the blades.

3. A gardening tool as defined in claim 1, wherein each of the one or more connecting members is radially inward of a radially outermost portion of the blades.

4. A gardening tool as defined in claim 1, wherein a circumferential width of each of the plurality of blades decreases in the downward direction.

5. A gardening tool as defined in claim 1, further comprising:
a blade plate at an upper end of the plurality of blades for connecting the blades, the shaft secured to the blade plate.

6. A gardening tool as defined in claim 5, wherein each of the one or more connecting members is in sliding contact with the blade plate during axial movement of the connecting members.

7. A gardening tool as defined in claim 6, wherein frictional contact between the blade plate and at least one of the one or more connecting members prevents axial movement of the ejector body by gravity.

8. A gardening tool as defined in claim 1, wherein at least a portion of the ejector control member at least partially circumscribes the shaft, is in sliding contact with the shaft, and is supported on the shaft.

9. A gardening tool as defined in claim 1, wherein the ejector control member further comprises:
one of a sleeve and a coil spring circumscribing the shaft.

10. A gardening tool as defined in claim 1, further comprising:
a motor at the upper end of the shaft for rotating the shaft about the axis.

11. A gardening tool as defined in claim 1, further comprising:

a hand crank at the upper end of the shaft for rotating the shaft about the axis.

12. A gardening tool for extracting vegetation having roots, the gardening tool comprising:
a shaft rotatable about an axis, the shaft including an upper end, a lower end axially spaced from the upper end, and a shaft outer surface;
a plurality of blades circumferentially spaced about the axis and extending downwardly beyond the lower end of the shaft for insertion into soil about the roots, each blade including a trailing edge and a leading edge that leads the trailing edge during rotation in a selected rotational direction about the axis, the leading edge of at least one blade being substantially non-tapered to extend in a direction substantially parallel to the axis, the trailing edge being tapered along at least 50% of the blade's length to extend in a direction angled relative to the axis, such that a circumferential width of the blade decreases in the downward direction, each blade having a circumferential width greater than its radial thickness along a majority of the length of each blade, the circumferential width of each blade being substantially perpendicular to the radial thickness of the respective blade, the plurality of blades forming a rotating blade diameter, each blade having a flat interior surface to rotate soil radially interior of the interior surface of the blade and within the rotating blades;
a blade plate at an upper end of the blades for connecting the blades, the shaft secured to the blade plate, each of the plurality of blades extending from a lower tip end to a blade upper end opposite the ejector body with respect to the lower tip end;
an ejector body positioned between the blades, the ejector body axially movable from an upper position to a lower position to eject soil from between the blades, the ejector body having a rotating body diameter less than the rotating blade diameter, such that the ejector body fits within a cylindrical hole in the ground formed by the plurality of rotating blades;
an ejector control member at least substantially surrounding the shaft, the ejector control member axially movable by hand;
one or more connecting members spaced circumferentially about the shaft such that each connecting member is circumferentially positioned between two of the blades, the one or more connecting members connecting the ejector control member to the ejector body such that axial movement of the ejector control member causes axial movement of the ejector body, each of the one or more connecting members is radially inward of a radially outermost portion of the blades, and is in sliding contact with the blade plate during axial movement of the connecting members; and
frictional contact between the blade plate and at least one of the one or more connecting members prevents axial movement of the ejector body by gravity.

13. A gardening tool as defined in claim 12, further comprising:
a motor or a hand crank at the upper end of the shaft for rotating the shaft about the axis.

14. A gardening tool as defined in claim 12, wherein each of the plurality of blades is spaced radially outward from the shaft outer surface.

15. A method for extracting vegetation having roots, the method comprising:
providing a shaft rotatable about an axis, the shaft including an upper end and a lower end axially spaced from the upper end;
circumferentially spacing a plurality of blades about the axis with the blades extending downwardly beyond the lower end of the shaft, each blade including a trailing edge and a leading edge that leads the trailing edge during rotation in a selected rotational direction about the axis, each blade having a circumferential width substantially greater than its radial thickness along a majority of the length of each blade, and at least one of the trailing edge and leading edge being tapered relative to the axis of the shaft along a majority of the length of each blade, and the leading edge when rotating forming a uniform diameter cylinder along the majority of the length of each blade, each blade having a flat interior surface to rotate soil within the rotating blades;
positioning an ejector body between the blades, the ejector body axially movable from an upper position to a lower position, each of the plurality of blades extending from a lower tip end to a blade upper end opposite the ejector body with respect to the lower tip end;
positioning an ejector control member at least substantially surrounding the shaft, the ejector control member axially movable by hand;
circumferentially spacing one or more connecting members about the shaft and connecting the ejector control member to the ejector body with the one or more connecting members, such that axial movement of the ejector control member causes axial movement of the ejector body;
moving the ejector control member to move the ejector body to the upper position prior to inserting the blades into the soil;
frictionally contacting at least one of the one or more connecting members with a blade plate to resist axial movement of the ejector body to hold the ejector body in the upper position;
moving the shaft downward to insert the blades into the soil about the roots;
applying a torque to the shaft to rotate the blades in the selected direction about the axis;
moving the blades upward to extract a portion of the soil and at least a portion of the vegetation; and
moving the ejector control member by hand to move the ejector body from the upper position to the lower position to eject the extracted portion of the soil from between the blades.

16. A method as defined in claim 15, further comprising:
the ejector body having a rotating body diameter less than the rotating blade diameter, such that the ejector body fits within a cylindrical hole in the ground formed by the plurality of rotating blades.

17. A method as defined in claim 15, further comprising:
rotating the shaft with a hand crank.

\* \* \* \* \*